TELEVISION RECEIVER FINE TUNING INDICATOR

Filed March 5, 1957

Inventors:
Walter Bruch & Klaus Hecker
By [signature]
Patent Agent

Sept. 15, 1959 W. BRUCH ET AL 2,904,630

TELEVISION RECEIVER FINE TUNING INDICATOR

Filed March 5, 1957 5 Sheets-Sheet 2

Inventors:
Walter Bruch & Klaus Hecker
By Erich D. Frankel
Patent Agent

Inventors:
Walter Bruch & Klaus Hecker
By [signature]
Patent Agent

Sept. 15, 1959 W. BRUCH ET AL 2,904,630
TELEVISION RECEIVER FINE TUNING INDICATOR
Filed March 5, 1957 5 Sheets-Sheet 4
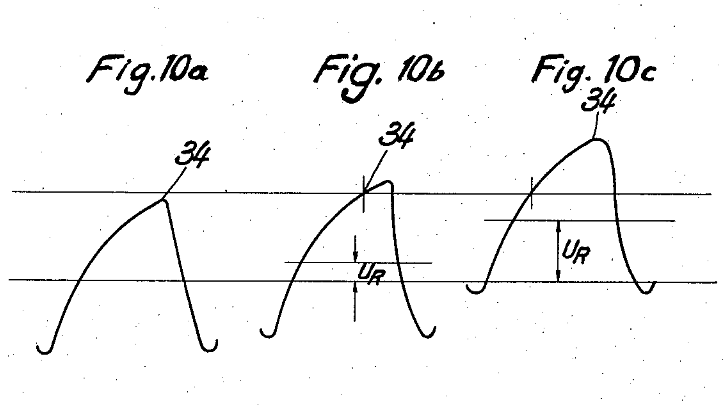
Fig. 10a, Fig. 10b, Fig. 10c
Fig. 11a Fig. 11b Fig. 11c
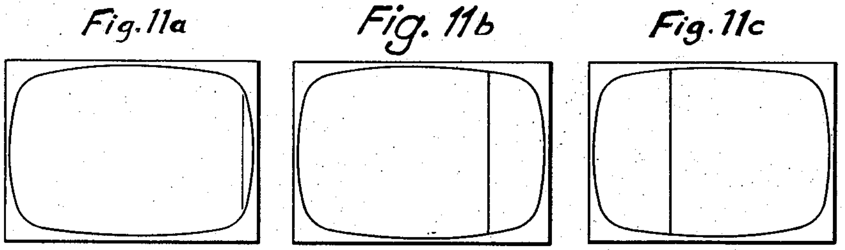
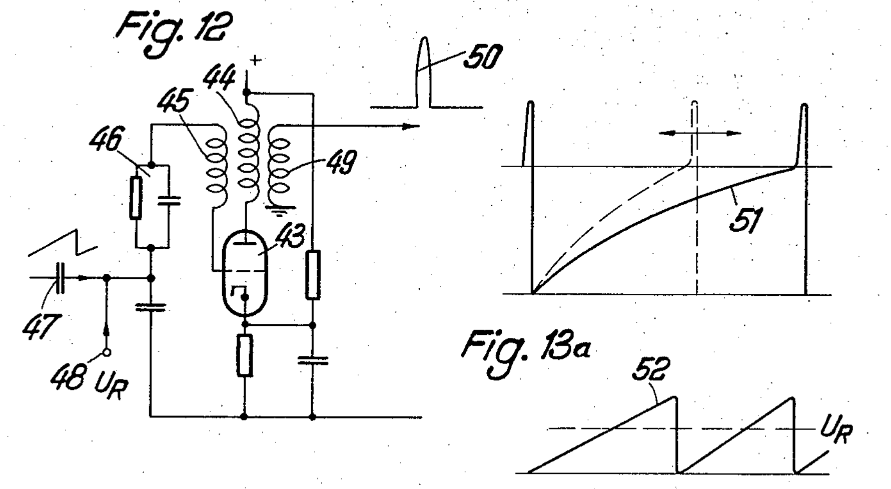
Fig. 12, Fig. 13a
Fig. 13b
Inventors:
Walter Bruch & Klaus Hecker
By [signature]

TELEVISION RECEIVER FINE TUNING INDICATOR

Inventors:
Walter Bruch & Klaus Hecker
By [signature]
Patent Agent

United States Patent Office 2,904,630
Patented Sept. 15, 1959

2,904,630

TELEVISION RECEIVER FINE TUNING INDICATOR

Walter Bruch and Klaus Hecker, Hannover, Germany, assignors to Telefunken G.m.b.H., Berlin, Germany Application March 5, 1957, Serial No. 644,032

Claims priority, application Germany March 13, 1956

13 Claims. (Cl. 178—7.5)

The present invention relates to circuit arrangements to facilitate and to indicate the correct tuning of internal adjustments in television receivers. Most of the television receivers on the market are provided with a channel selector switch having a detent for the coarse selection of each of the channels. It is necessary in such receivers to provide an additional fine adjustment for each detent position in order to compensate for drifting of the local oscillator frequency. The operation of the fine tuning adjustment is quite difficult for the layman, because it requires patient experiments to judge the best reproduction of the constantly changing picture.

Therefore, it has been suggested to carry out the fine tuning by means of a so-called "magic eye" of the type used in radio receiver sets. However, the presence of such a device is disturbing because its bright green light spot is continuously visible during the watching of a program.

Furthermore, it has been known to provide in television receivers an arrangement according to which the picture tube of the receivers is utilized simultaneously as an indicating means for the fine tuning. The addition of such an arrangement involves added expenses and is difficult to operate.

It is an object of the present invention to provide circuits providing fine tuning indications in television receivers equipped with a cathode ray tube which may be utilized to display the tuning indication, these circuits avoiding the foregoing disadvantages.

It is another object of the invention to apply to the picture tube a voltage which depends upon the fine tuning of the receiver for furnishing a tuning indication in such a manner that a pattern is produced on the picture screen, the form of this pattern indicating the accuracy of tuning.

It is a further object of the present invention to apply the indicating voltage to the cathode ray tube in such a manner that, during the fine tuning, a D.C. voltage $U_R$ which is derived from the intermediate frequency circuit and is dependent upon the accuracy of tuning, is fed together with an A.C. voltage to the cathode ray tube either directly or via one or several amplifier tubes, so that a black and white pattern will be visible on the picture screen, whereby the white or black portion is a minimum in case of optimum tuning, i.e., when the D.C. voltage $U_R$ is at a maximum.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
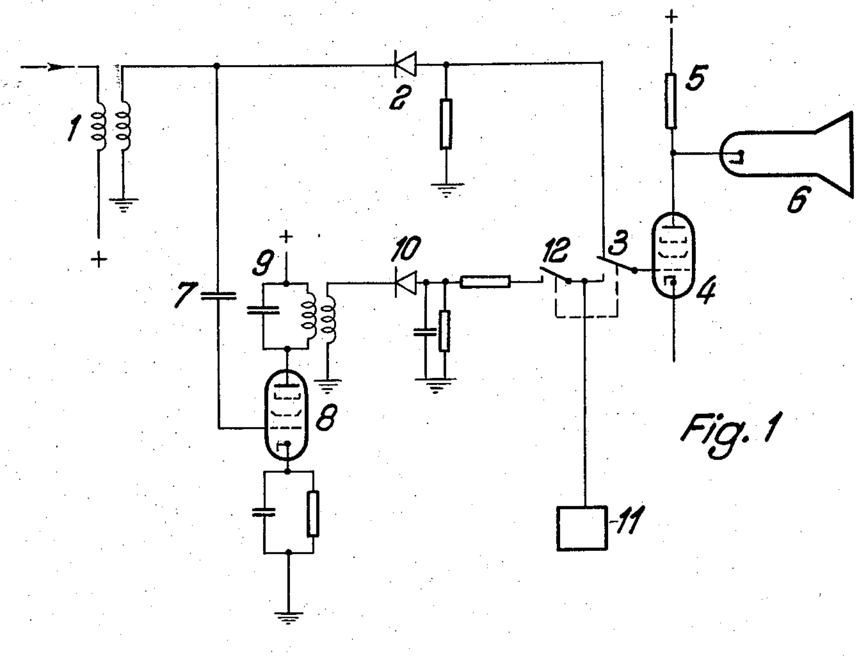
Figure 1 is a schematic diagram showing one embodiment of a circuit adapted to provide on the picture screen of a television receiver set a visual indication of the accuracy of fine-tuning of the receiver.
Figure 9:
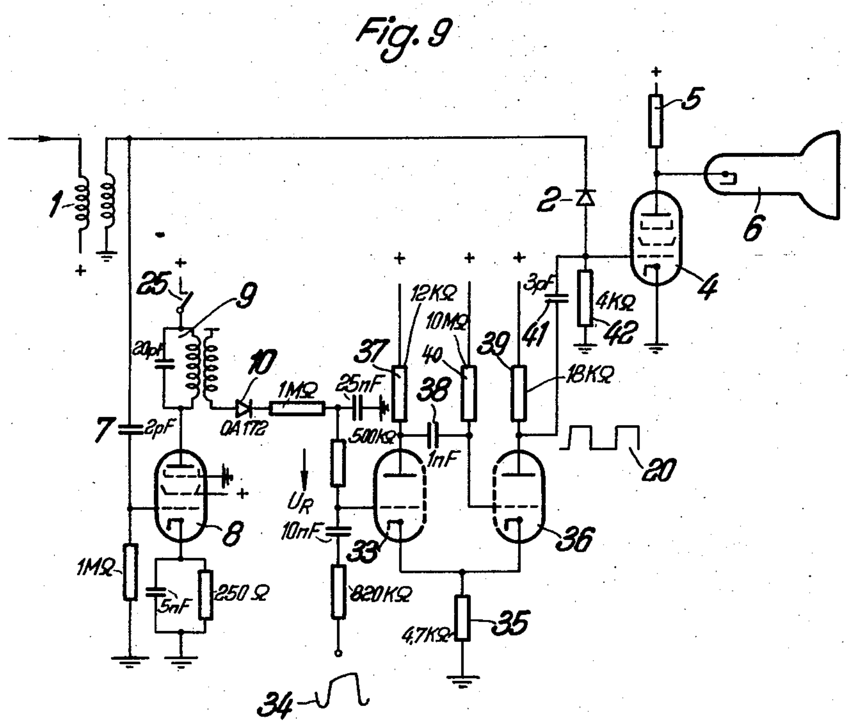
Figure 9 is a schematic diagram showing a modified embodiment of a tuning-indicating circuit similar to that illustrated in Figure 1.
Figure 14:
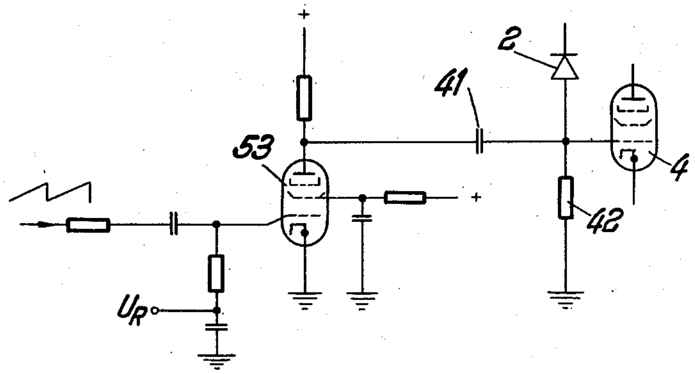
Figures 15A, 15B:
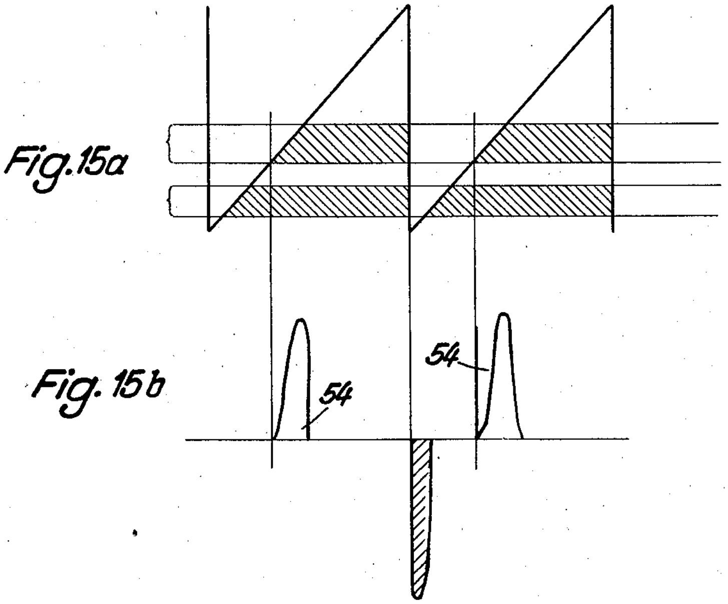

Figures 10*a*, 10*b*, 10*c* are graphical representations of voltages associated with the circuits of Figure 9;

Figures 11*a*, 11*b* and 11*c* are illustrations of the tuning indications displayed on the picture screen of a television receiver employing the circuit illustrated in Figure 1, these figures respectively corresponding with the graphical illustrations of Figures 10*a*, 10*b* and 10*c*;

Figure 12 is a schematic diagram of a generator for producing tuning-indication pulses synchronized with the receiver sweep frequency but displaceable on the picture screen according to the accuracy of fine-tuning of the receiver;

Figures 13*a* and 13*b* are graphical illustrations showing wave forms appearing in the circuit of Figure 12;

Figure 14 is a further modified embodiment of a generator intended to perform a function similar to that of the generator in Figure 12;

Figures 15*a* and 15*b* are graphical illustrations showing wave forms appearing in the circuit of Figure 14.

Referring in detail to the drawings, Figure 1 shows a circuit for producing an indicating voltage, wherein an intermediate frequency amplifier, not shown, is coupled to a video rectifier 2 via a transformer 1. The rectified video signal is fed to the final video tube 4 via a change-over switch 3 and appears across an anode resistance 5 of the tube 4, the output being connected to the cathode of a cathode ray tube 6. The secondary circuit of the transformer 1 is connected to a separator tube 8 via a condenser 7. Connected with the plate of the tube 8 is a tuned circuit 9 resonant at the intermediate frequency of the picture or sound carrier. Thus, the magnitude of the voltage in the tuned circuit 9 is dependent on proper fine tuning. This voltage, after rectification by means of a rectifier 10, is combined as a D.C. voltage $U_R$ with an A.C. voltage derived from a source 11 synchronized with the scanning sweep and being of sine, saw-toothed, or pulse shape. Voltages of this kind, which are synchronized with the scanning, are available in the sweep circuits of the receiver set. Two switches 3 and 12, operated by means of a push-button, not shown, are used for changing-over the receiver set from picture modulation to tuning indication, these switches connecting the control grids of the final video tube 4 simultaneously with the D.C. control voltage source 9—10 and with the A.C. voltage source 11. An additional switch contact operable by means of the same push button may be associated with this circuit to adjust for maximum contrast. When a special tube is added for obtaining the indicating voltage, it may be advantageous to either switch off this tube or to cut it off at its grid when not in use for tuning. This will prevent harmonics of the intermediate audio frequency which may occur in the tuned circuit 9 from impairing the picture. In this case, it is possible to utilize as the separator tube a tube already present in the set, for example, a low frequency amplifier tube, which would otherwise be useless during the tuning operation.

Figure 2:
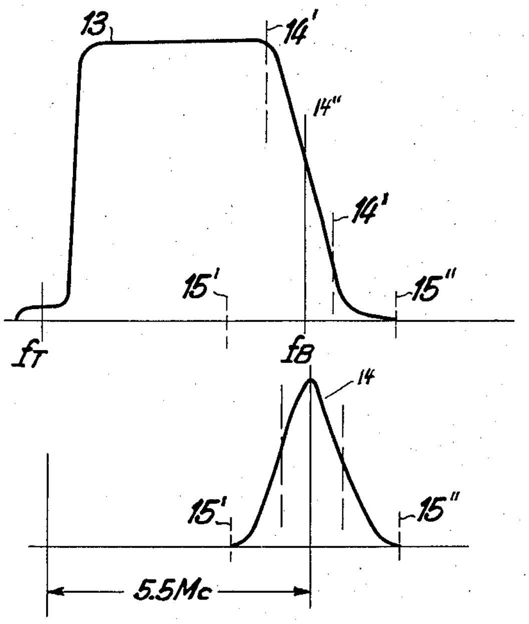
Figures 2, 3, 7 are graphical representations intended to illustrate the operation of the circuits in Figure 1.
Figure 3:
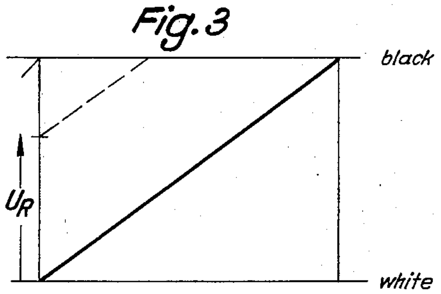

The operation of the circuit described will be explained with reference to Figures 2 to 6, inclusive. The diagram of Figure 2 shows the selectivity curve 13 of the intermediate frequency amplifier, below which curve the resonance curve 14 of the tuned circuit 9 adjusted to the intermediate frequency $f_B$ of the picture carrier is illustrated in such a manner, that the center of resonance of the tuned circuit 9 coincides with the desired position 14'' of the picture carrier on the selectivity curve. In case of improper tuning, the actual picture carrier 14' is off of the center of resonance of the tuned circuit 9, so that a low voltage in the tuned circuit 9 is obtained. In case of proper tuning, the actual picture carrier 14'' is at the peak of the resonance curve and thereby causes a maximum D.C. voltage $U_R$ to appear at the output of the rectifier 10. A saw-tooth voltage, such as shown in Figure 3, is superimposed on this D.C. voltage $U_R$, the amplitude of which is dependent upon the accuracy of tuning of the picture carrier, whereby the duration of the saw-tooth voltage just corresponds with the duration of one line.

Figure 7:
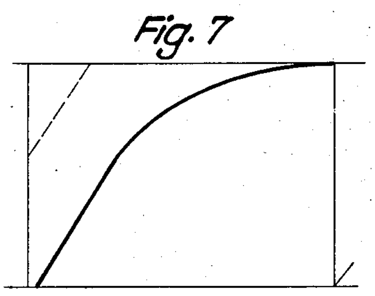
Figure 4:
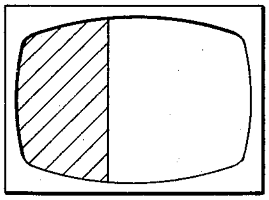
Figures 4, 5, 6 are illustrations of the tuning indications displayed on the picture screen of the television receiver.
Figure 5:
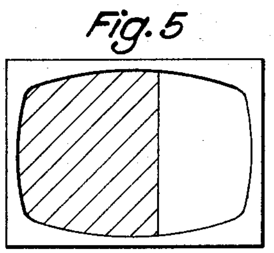
Figure 6:
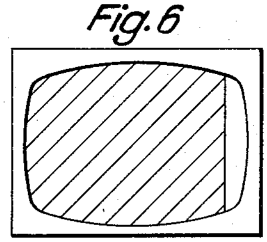

In the case of a large mistuning, i.e., if only the A.C. voltage without a D.C. voltage component, as indicated in Figure 2 by the positions 15' or 15'' of the intermediate frequency, were to be fed to the control grid of the final video tube 4, an image according to Figure 4 would appear on the screen of the cathode ray tube. This image has a white portion on one side and a dark portion on the other side separated along a more or less sharp transition zone. If the D.C. voltage component is then increased by better tuning, the leading edge of the saw-tooth is displaced parallel upwardly, as indicated by a dash-dash line in Figure 3. As shown in Figures 5 and 6, the picture is then displaced towards the dark portion, i.e., the white portion will become smaller (see 14'' in Figure 2) until, at optimum tuning (at a maximum D.C. voltage), only a narrow strip of white will remain. If this saw-tooth voltage with a linearly ascending slope is used, the transition from white to black is gradual, so that no distinct change from white to black, as shown in the figures, is present. Consequently, a modified saw-tooth voltage, according to Figure 7, is preferably used, whereby the leading edge of this voltage is first very steep and then changes to a flatter ascending portion. It is possible to obtain a relatively sharp demarcation between white and black with such a modified saw-tooth component. In this case, the maximum D.C. voltage is selected in such a manner that it is equal to the voltage of the saw-tooth curve at the end of the steep rise of the saw-tooth voltage. The steepness on the rising edge is a measure of the sharpness of demarcation between the white and black picture portions as well as of the sensitivity of the tuning indication. It is necessary to consider both optimum sensitivity and distinctness when selecting the A.C. voltage. A single demarcation between white and black is present in case of the use of saw-tooth voltages according to Figures 3 and 7. Several such demaracations are produced in case of a sine-wave A.C. voltage. Therefore, it is possible to obtain on the picture screen a black-white distribution in which these two fields alternate, for example, like a comb, or in which demarcations between white and black or vice versa are obtained in any manner, by suitable selection of the A.C. voltage shape and the D.C. component which is varied during fine tuning, whereby the demarcations are displaced with respect to one another when the control D.C. voltage is varied, or the area ratio of the black and white fields changes correspondingly. In this way, in case of a mixed A.C. voltage, containing both line and picture frequency components, a slanting demarcation between white and black will result such, that in case of proper tuning, the white or black portion of the picture will be crowded into one corner of the screen.

Figure 8:
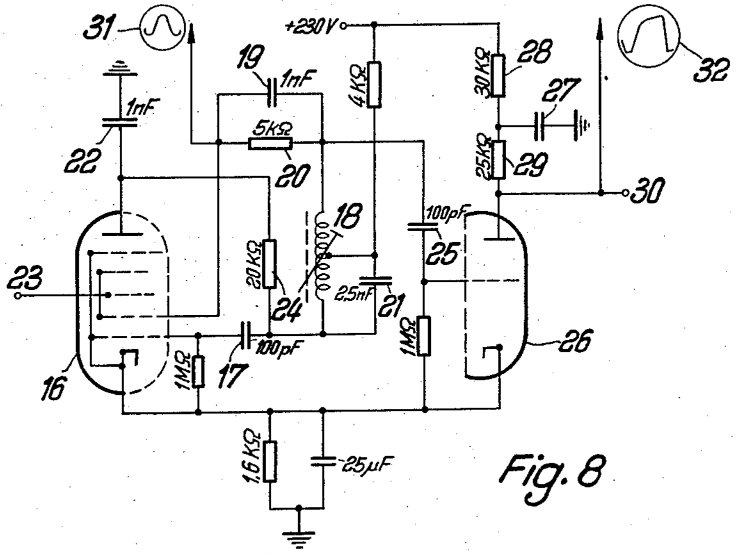
Figure 8 is a schematic diagram of an electronic generator for generating a tuning-indicating voltage.

An example of the alternating voltage source 11 is diagrammatically presented in detail in Figure 8. A sine wave or approximately tooth-shaped voltage can be derived, for example, from the circuit producing the line sweep frequency of the television receiver if this circuit contains a so-called sine-wave generator. In this case, a triode-pentode is used as a sine-wave oscillator and tooth-shaped generator. The pentode portion 16, in which the second and fourth grid are inter-connected within the tube, serves as a sine-wave oscillator in the lower part of the pentode portion 16. In order to accomplish this, the first grid is connected to one terminal of an inductance 18 via blocking condenser 17, while the other terminal of the inductance 18 is connected to the second and fourth grids via a condenser 19 and a resistance 20 which are shunted. A condenser 21 is arranged parallel to a portion of the inductance 18, said condenser being adapted to tune the oscillator to the sweep frequency. The inductance 18 can be made adjustable by means of a displaceable core. The anode of the pentode system 16 is connected to ground via a condenser 22. A phase-displaced component of the oscillator frequency is formed across this condenser 22, the amplitude of this voltage is controlled by a phase comparison voltage fed to the terminal 23 at the third grid of the pentode system. This phase displaced voltage is fed from the anode of the pentode via the resistance 24 to that terminal of the inductance 18 which is connected to the pentode system. The output voltage is derived from the other terminal of the inductance and is fed via the condenser 25 to the grid of the triode system 26 which is arranged as a saw-tooth generator. For this purpose, a condenser 27 is inserted in the anode circuit of the triode system, said condenser being slowly charged via the resistance 28 in a manner known per se during the forward sweep of the saw-tooth and being rapidly discharged via the triode and a resistance 29 inserted therebetween during the return trace of the saw-tooth. The saw-tooth voltage at the condenser 27 is taken off at the anode of the triode and is fed to the remaining deflection circuits, for example, to the grid of the final sweep tube of the television receiver set via the terminal 30. A sine-wave voltage 31 is available at that end of the RC circuit 19, 20, which is connected to the second grid of the pentode system 16, said voltage 31 being adapted for use as the A.C. voltage component of the tuning indication. A saw-tooth voltage 32, suitable for the same purpose, may be taken from the terminal 30. The values of the circuit components are indicated in Figure 8 and are obtained during a practical test of the circuit applied to a standard television receiver set.

Figure 9 is an embodiment of the invention in which the image pattern produced on the picture screen is varied by means of a sweep generator controlled by the D.C. voltage $U_R$. The same reference characters as in Figure 1 are used for similar circuit components in Figure 9. The voltage at the tuned circuit 9, the magnitude of which is dependent upon the accuracy of tuning, is rectified in the rectifier 10 and is fed as a D.C. voltage $U_R$ to the input of a multivibrator. The latter comprises a first tube 33, to the control grid of which the D.C. voltage $U_R$ and a substantially saw-tooth shaped voltage 34 are fed. The cathode of the tube 33 is connected to ground via a resistance 35 which serves simultaneously as a cathode resistance of a second tube 36. The anode of the tube 33 is connected via a resistance 37 with a positive supply voltage and via a condenser 38 to the control grid of the tube 36 which is biased positive via a resistance 40, and wherein the anode of the tube 36 is connected to a positive supply voltage via a resistance 39. The anode of the tube 36 is connected to the control grid of the final video tube 4 via a condenser 41 which, together with the load resistance 42 of the video rectifier 2, forms a differentiating circuit adapted to convert the square edges of the multivibrator pulses into two triangular sharp pulses.

The operation of the circuit according to Figure 9 will be described in the following with reference to Figures 10*a*, 10*b*, 10*c*, and Figures 11*a*, 11*b* and 11*c*. The curves of three different conditions of circuit tuning are diagrammatically illustrated in Figures 10*a*, 10*b* and 10*c*. The tube 36 of the multivibrator is ordinarily conductive, the grid of this tube is positively biased above the cathode potential. However, the tube 33 is nonconductive because its grid voltage is highly negative with respect to its cathode. If now the saw-tooth voltage is applied to the control grid without addition of the D.C. voltage $U_R$, the amplitude is not large enough to render the tube 33 conductive, see Figure 10*a*. The tube will become conductive only by applying a positive D.C. voltage $U_R$, Figures 10*b* and 10*c*, whereby the sweep action is suddenly initiated. As a result of this, the tube 33 becomes conductive and the voltage of its anode is lowered. Thus, the grid of the tube 36 is driven negative by an impulse via the condenser 38 and is thus suddenly cut off. Furthermore, the cathode potential is increased because the tube 33 now conducts a higher anode current since the external resistance 37 of this tube has a lower value than that of the tube 36. The rising saw-tooth voltage at first maintains the tube 33 conductive, so that no change occurs at the anode of this tube. The time constant of the circuit 40—38 is so long that the condenser 38 is very slowly discharged. Consequently, the control grid of the tube 36 retains for the time being its negative voltage. However, when the saw-tooth voltage drops below the lower blocking limit of the tube 33 and thereby the control grid of this tube becomes negative, the voltage at the anode of the tube 33 increases suddenly. This positive impulse is applied to the control grid of the tube 36 via the condenser 38, whereby the tube 36 again becomes conductive. This condition remains stable until the saw-tooth shaped voltage at the control grid of the tube 33 again exceeds the cathode potential. Therefore, the triggering of the multivibrator by the applied positive D.C. voltage can be shifted in time by the use of a rising A.C. voltage, i.e., a substantially saw-tooth shaped voltage. This shifting of the initiating, shown in Figures 10*a*, 10*b* and 10*c*, actually results in a variation of the width of the pulses generated by the multivibrator. Figure 10*a* illustrates the condition in which no D.C. voltage is present at the control grid of the tube 33, so that the amplitude of the saw-tooth shaped voltage does not exceed the cathode to trigger the multivibrator.

Figure 10*b* shows the shape of the grid voltage where a small D.C. voltage has been applied, whereby the peak of the saw-tooth curve just exceeds the value required to trigger the circuit. As a result of this, a narrow pulse is obtained at the anode of the tube 36. Figure 10*c* illustrates the same kind of operation but for the application of a higher D.C. voltage, whereby the triggering pulse is relatively wide. Fine tuning can be carried out with the aid of these pulses. Due to the applying of a square pulse changeable in its width, a sharp demarcation between black and white is obtained on the picture screen and the line of demarcation is displaceable, depending upon the width of the pulses applied to the cathode ray tube.

If these rectangular pulses are fed to the video channel via a differentiating member, another picture pattern is obtained in which, in place of the black-white surfaces with sharp demarcation, only thin black and white lines, as shown in Figures 11*a*, 11*b* and 11*c*, will appear on the image screen, whereby the actual television program will be practically undisturbed by the indication. The indicating line can be made invisible during the transmission of the television program by shutting off the anode voltage of the separator tube and connecting it only during the duration of the tuning.

In Figure 12, another embodiment of the invention is shown, i.e., a blocking oscillator circuit arrangement comprising a tube 43, the anode of which is connected to the supply voltage via the inductance 44. An inductance 45, coupled with the inductance 44, and an RC circuit 46 are inserted in the control grid circuit of this tube 43. A saw-tooth shaped voltage is fed to the control grid via a condenser 47, while, at the same time, the D.C. voltage $U_R$ is fed to this control grid via a terminal 48. Another inductance 49 is coupled to the inductance 44, whereby the output voltage, i.e., a narrow pulse 50, is induced in the inductance 49 and is fed to the video channel, preferably to a different electrode of the picture tube than the picture signal. The frequency of the freely oscillating blocking oscillator is selected to be lower than the frequency of the applied saw-tooth voltage at sweep frequency.

Figure 13*a* shows the effective voltage at the control grid of the tube 43, wherein the curve 51 corresponds to a freely oscillating blocking oscillator. If this curve is superimposed on a saw-tooth 52 at the sweep frequency, Figure 13*b*, the tube is rendered conductive at an earlier than normal instant and a short high pulse is induced in the inductance 49. By adding the D.C. voltage $U_R$ to the saw-tooth 52, this triggering is made to occur earlier or later, so that the line illustrated on the picture screen is laterally displaced.

In a still further embodiment of this invention, shown in Figure 14, the pulses required for the indication are obtained by limiting one saw-tooth voltage derived from the deflection stage. As shown in Figure 15*a*, the approximately saw-tooth shaped voltage is fed to the limiter tube 53, which clips the saw-tooth preferably on both sides. The simultaneously fed D.C. voltage $U_R$ shifts this saw-tooth more or less into the clipping range and thereby effects a change in the width of the approximately rectangularly clipped voltage occurring at the anode of the tube 53. This rectangular voltage is fed to the video channel or the control grid of the video amplifier tube 4 via a differentiating circuit 41, 42, whereby narrow displaceable pulses 54 are superimposed to the picture content, as shown in Figure 15*b*.

The invention is not limited to the circuit arrangement shown in the examples. It is applicable to all suitable sweep generators in which the time of triggering of the sweep can be varied.

We claim:

1. A system for displaying on the screen of a television receiver a pattern indicating the accuracy of fine tuning of the received signals to the selectivity curve of the receiver intermediate-frequency amplifier, and said receiver including a picture tube having a brightness controlling electrode and including at least one sweep circuit delivering recurring sweep voltages, said system comprising a tuned circuit connected to said intermediate-frequency amplifier; means whereby said tuned circuit delivers an output which is maximum for accurately tuned signals but which drops off rapidly with detuning; means including a rectifier and a smoothing filter connected to said tuned circuit for delivering a D.C. voltage $U_R$ proportional to the accuracy of fine tuning; means including an A.C. voltage generator connected with said sweep circuit and producing cycle of the A.C. voltage synchronized to recur at the same instant with respect to each sweep cycle; and at last one control tube connected with said electrode and having an input circuit, means whereby said A.C. voltage is fed to said control tube input circuit to produce an intensity pattern on the screen corresponding with portions of said A.C. voltage form and means whereby said D.C. voltage is connected to said control tube input circuit to form a bias pedestal to displace said A.C. voltage portions in time and displace the intensity pattern position on said screen according to variations in said D.C. voltage $U_R$.

2. In a system as set forth in claim 1, said control tube comprising the final video amplifier stage in said receiver and connected with said electrode, the control tube having a threshold of sensitivity, and means whereby the A.C. generator comprises an oscillator synchronized with said sweep voltages and delivers an A.C. voltage wave form having at least one peak per sweep cycle said peaks extending into said threshold and being separated by sloping portions of the A.C. wave form, and means whereby said D.C. voltage $U_R$ is applied to said input circuit with said A.C. voltage and alters the position of the sloping portions of said A.C. wave form with respect to said threshold to alter the distribution on said screen of relatively lighter and darker areas.

3. In a system as set forth in claim 2, said source of A.C. voltage generator comprising a sine-wave oscillator connected and synchronized with said sweep circuit.

4. In a system as set forth in claim 3, a saw-tooth oscillator connected between said sine-wave generator and said picture tube electrode.

5. In a system as set forth in claim 2, said A.C. voltage generator comprising the television receiver sweep circuit delivering a sloping A.C. wave form corresponding with the scanning cycle of the picture tube sweep and applied with the D.C. voltage $U_R$ on said final video amplifier input circuit.

6. In a system as set forth in claim 1, said source of A.C. voltage comprising a pulse generator having a synchronizing grid, the latter being connected with the sweep voltage from said sweep circuit to trigger the pulse generator in time with each sweep cycle and said D.C. voltage $U_R$ being connected to bias said grid, means whereby variations in said D.C. voltage will change the position of the point on said sweep voltage wave form at which said pulse generator is triggered to change the position of said intensity pattern, the output of said pulse generator being connected to said control tube input circuit.

7. In a system as set forth in claim 6, said pulse generator comprising a mono-stable multivibrator circuit.

8. In a system as set forth in claim 6, said pulse generator comprising a blocking oscillator having a time-constant longer than the period of the sweep cycle.

9. In a system as set forth in claim 8, means whereby the blocking oscillator furnishes a very narrow pulse synchronized with the horizontal sweep of the television receiver and provides an intensity line pattern on the picture screen said line being moved on the screen by variations in the D.C. voltage $U_R$.

10. In a system as set forth in claim 6, means whereby said pulse generator comprises a mono-stable multivibrator and generates a square wave during each cycle of the sweep, and a differentiating circuit connected to the output thereof provides sharp pulses corresponding with the leading and trailing edges of the square wave.

11. In a system as set forth in claim 1, said sweep voltage being saw-tooth in form and comprising said A.C. voltage fed with said D.C. voltage $U_R$ to said input circuit, a clipper stage in said input circuit and means whereby said clipper stage delivers an output which is substantially a square wave having a leading edge displaced in time with respect to the receiver sweep as said D.C. voltage varies and having a trailing edge which coincides in time with the sweep return trace; and a differentiating circuit following said clipper for producing a pulse coinciding in time with the position of the leading edge of said square wave.

12. In a system as set forth in claim 1, said control tube comprising the receiver final video amplifier switch means connected between said input circuit and said amplifier for disconnecting said tuning indicating system from said picture tube electrode.

13. In a system as set forth in claim 1, disconnecting switch means in said input circuit for incapacitating said tuned device during periods of dis-use.

References Cited in the file of this patent

UNITED STATES PATENTS

| | | |
|---|---|---|
| 2,180,944 | Linsell | Nov. 21, 1939 |
| 2,773,119 | Parker | Dec. 4, 1956 |